United States Patent
Peters, Jr. et al.

(10) Patent No.: US 8,623,203 B2
(45) Date of Patent: Jan. 7, 2014

(54) STORMWATER TREATMENT SYSTEM

(75) Inventors: John Peters, Jr., Manorville, NY (US);
John E. Markee, Selden, NY (US)

(73) Assignee: Fabco Industries, Inc., Jericho, NY (US)

( * ) Notice: Subject to any disclaimer, the term of this patent is extended or adjusted under 35 U.S.C. 154(b) by 248 days.

(21) Appl. No.: 13/092,427

(22) Filed: Apr. 22, 2011

(65) Prior Publication Data

US 2012/0267319 A1 Oct. 25, 2012

(51) Int. Cl.
*E03F 5/14* (2006.01)
*B01D 35/02* (2006.01)
*B01D 29/48* (2006.01)

(52) U.S. Cl.
CPC . *E03F 5/14* (2013.01); *B01D 35/02* (2013.01); *B01D 2221/12* (2013.01); *B01D 29/48* (2013.01)
USPC ............. 210/170.03; 210/446; 210/493.4; 210/497.1; 210/747.3

(58) Field of Classification Search
USPC ............. 210/747.2, 747.3, 787, 170.03, 435, 210/446, 493.4, 494.1, 497.1; 15/104.05, 15/104.061, 104.16, 164, 206, 211
See application file for complete search history.

(56) References Cited

U.S. PATENT DOCUMENTS

| | | | | |
|---|---|---|---|---|
| 488,784 A * | 12/1892 | Zolper | ............................ | 15/206 |
| 1,935,128 A * | 11/1933 | Pullman | ............................ | 4/286 |
| 2,742,661 A * | 4/1956 | Carvalho | ........................ | 15/211 |
| 4,935,132 A * | 6/1990 | Schaier | ......................... | 210/163 |
| 5,491,863 A * | 2/1996 | Dunn | ............................. | 15/164 |
| 5,980,740 A | 11/1999 | Harms et al. | | |
| 6,749,746 B2 * | 6/2004 | Mokrzycki | .............. | 210/170.03 |
| 6,811,692 B2 * | 11/2004 | Koteskey | ................. | 210/497.01 |
| 7,150,826 B2 | 12/2006 | Buckett | | |
| 2007/0267342 A1 | 11/2007 | Cobb et al. | | |
| 2008/0216221 A1 * | 9/2008 | Markaj | ............................. | 4/289 |

* cited by examiner

*Primary Examiner* — Christopher Upton
(74) *Attorney, Agent, or Firm* — The Patentwise Group, LLC (57) ABSTRACT

A stormwater treatment system includes water treatment media that defines a helical flow path within a conduit. The water treatment media may include a plurality of helical water treatment media components that are constructed and arranged to seal against an inside surface of the conduit. The individual helical water treatment media components may be installed in situ within the conduit when the conduit is positioned within a chamber having an access opening, and periodically removed and replaced by passing the components to the access opening. The components further may have a flexible frame, which allows the water treatment media to dynamically adjust to swelling of the filtration media and other forces that may occur during use. The performance of the system may be adjusted by adjusting the helical pitch of the helical water treatment media components.

11 Claims, 9 Drawing Sheets

STORMWATER TREATMENT SYSTEM

BACKGROUND OF THE INVENTION

1. Field of the Invention

This invention relates generally to the field of environmental remediation of stormwater. More specifically, this invention relates to an improved modular filtration system for a stormwater system.

2. Description of the Related Technology

Stormwater that is created by storm runoff in heavily developed areas is typically channeled into storm drainage systems that eventually drain into nearby streams, creeks, rivers or other bodies of water. For purposes of this document, stormwater includes not only storm runoff, but other sources of wastewater such as rinse water and melting snow and ice.

Paved surfaces that bear automobile traffic typically become coated with significant pollutants such as heavy metals and volatile organic compounds, both under normal traffic conditions and in particular when motor vehicle accidents occur. When normal rain or snowfall occurs, these pollutants tend to be swept away with the runoff stormwater and eventually lead to contamination of the bodies of water that eventually receive them. Such contamination has become a significant environmental issue in many areas. In addition, a significant amount of sediment and debris such as bottles and cans tends to be swept away by stormwater runoff. Some of the debris is heavier than water, and some of it has the tendency to float. Stormwater filtering systems have to be able to effectively filter both types of debris, in both ordinary and elevated flow conditions.

Depending on the location of a stormwater system inlet, the primary environmental concern may be pollutants or it may be sedimentation and larger debris.

Systems exist for filtering stormwater runoff that are effective to some extent in removing debris from stormwater and in removing certain other pollutants, such as hydrocarbons. For example, U.S. Pat. No. 6,080,307 discloses a storm drain insert that contains one basket for the collection of debris as well as a canister that contains a hydrophobic, compliant, oil-absorbent copolymer material that is said to be effective in removing oil from the stormwater. Additional systems for removing pollutants such as heavy metals from stormwater have been commercialized by Fabco Industries Inc., the assignee of this application.

The removal of sedimentation and larger debris from stormwater requires a system that is simple to install and to service, since the collected sedimentation and debris will have to periodically be removed from the system. Water treatment media such as filtration media will also have to be periodically inspected and replaced.

In any type of water treatment system, there is a trade-off between the amount of stormwater that the system can effectively process and the efficiency of the water treatment. In other words, for a given system, the greater the amount of stormwater to be processed, the less effective the treatment can be. Accordingly, it is advantageous to be able to design a system that is scalable for the anticipated flow rates in order to optimize water treatment efficiency and longevity of the system.

A need exists for an improved system and process for processing sediment and debris laden stormwater that can be optimized for anticipated conditions, that is effective under all conditions, that is suitable for filtering all kinds of debris, and that is moreover inexpensive to deploy and cost-effective to service.

SUMMARY OF THE INVENTION

Accordingly, it is an object of the invention to provide an improved system and process for processing sediment and debris laden stormwater that can be optimized for anticipated conditions, that is effective under all conditions, that is suitable for filtering all kinds of debris, pathogens, nutrients, oils and grease and that is moreover inexpensive to deploy and cost-effective to service.

In order to achieve the above and other objects of the invention, a stormwater treatment system according to a first aspect of the invention includes structure defining a first chamber for receiving stormwater; structure defining a second chamber; a conduit communicating the first and second chambers; and stormwater treatment media positioned within the conduit, the stormwater treatment media defining a substantially helical flow path for stormwater that passes through the conduit from the first chamber to the second chamber.

A method of treating stormwater according to a second aspect of the invention includes steps of deploying stormwater treatment media that defines a substantially helical flow path within a conduit; and passing stormwater through the conduit.

A modular helical water treatment media component according to a third aspect of the invention includes a flexible frame; and water treatment media attached to the flexible frame, the water treatment media being constructed and arranged to engage and substantially form a seal against an inner surface of a stormwater conduit, the water treatment media further defining a helical flow path for stormwater passing through the conduit.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
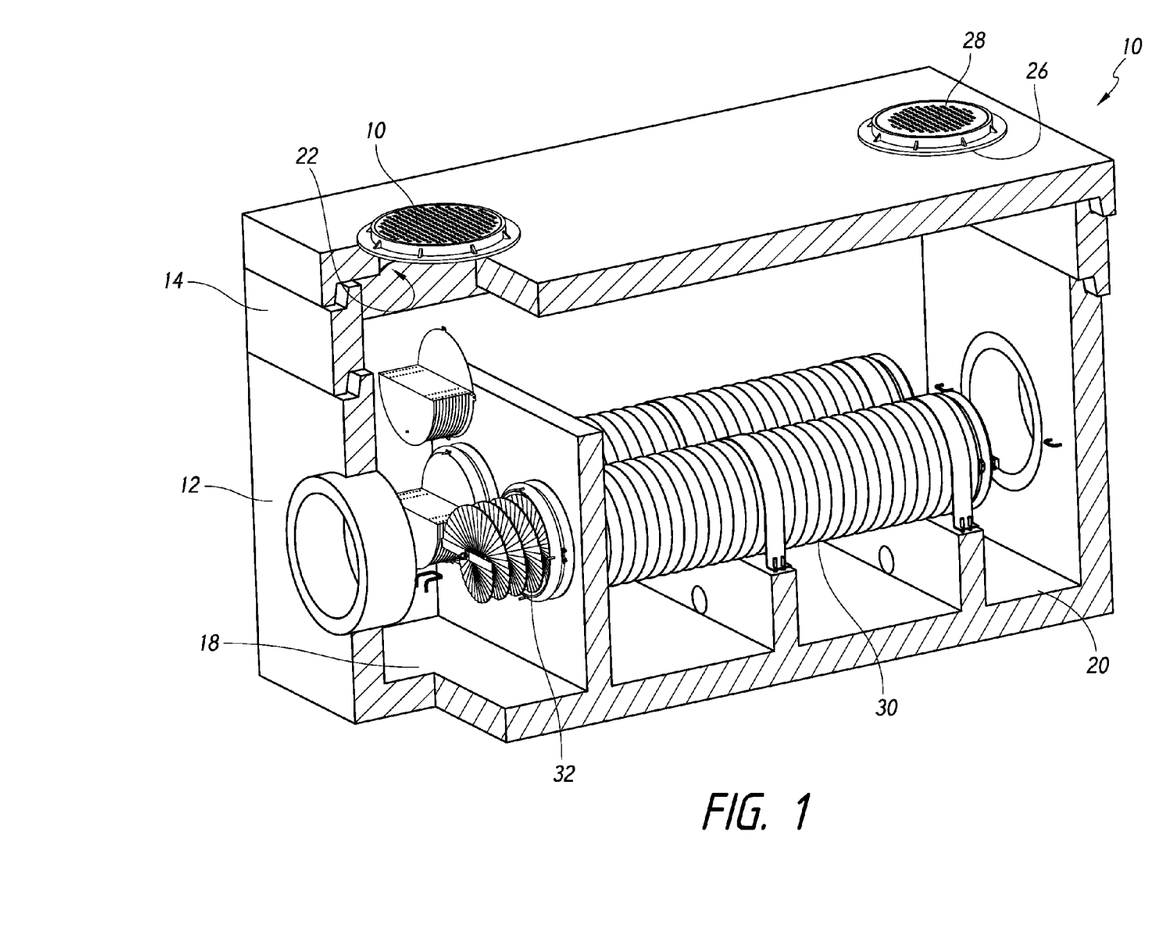
FIG. 1 is a perspective view depicting a stormwater treatment system that is constructed according to a preferred embodiment of the invention.
Figure 2:
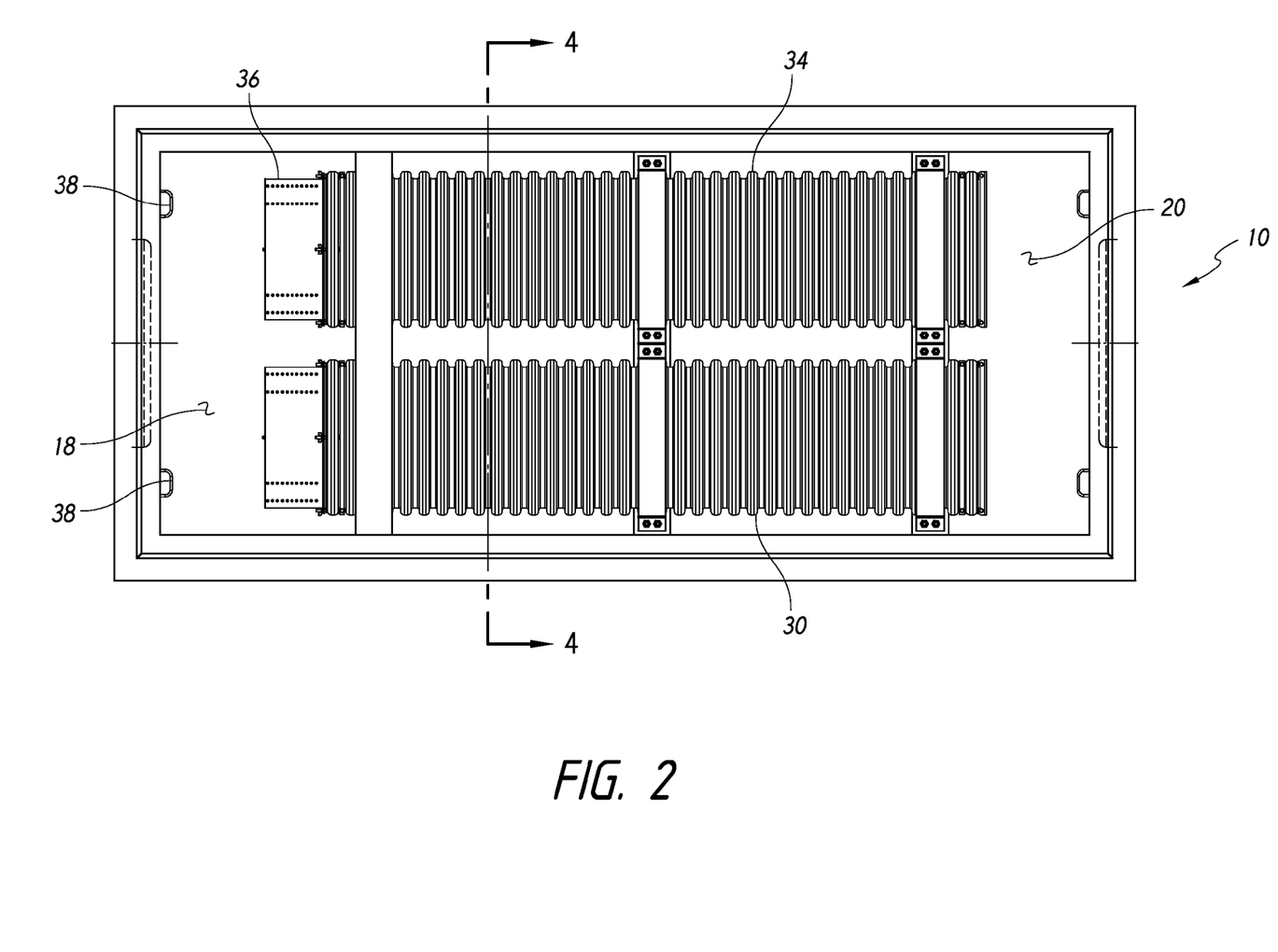
FIG. 2 is a fragmentary top plan view of the stormwater treatment system that is shown in FIG. 1.
Figure 3:
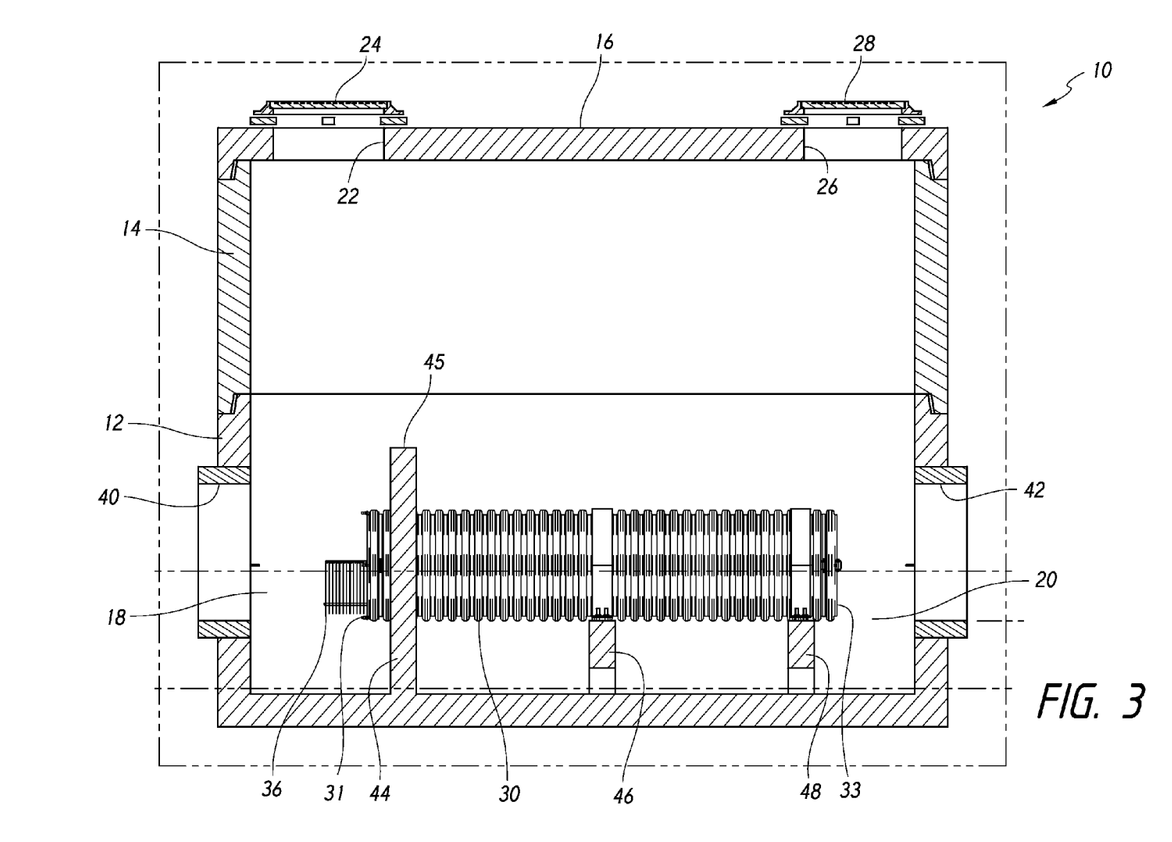
FIG. 3 is a longitudinal cross-sectional view of the stormwater treatment system that is shown in FIG. 1.

Referring now to the drawings, wherein like reference numerals designate corresponding structure throughout the views, and referring in particular to FIG. 1, a stormwater treatment system 10 that is constructed according to a preferred embodiment of the invention includes a base portion 12, a riser portion 14 and a top slab portion 16, each of which is preferably fabricated from a reinforced precast concrete material. The purpose of the riser portion 14 is to ensure that the access openings 22, 26 discussed below are accessible from grade level. In some cases, it is not necessary to use the riser portion 14. In those cases, the top slab portion 16 fits directly on the base portion 12.

Stormwater treatment system 10 includes structure defining a first influent chamber 18 for receiving stormwater and a second effluent chamber 20 into which treated stormwater is released.

The top slab portion 16 has a first access opening 22, positioned substantially over the first chamber 18, that is closable by a removable cover 24 and a second access opening 26, positioned substantially over the second chamber 20, which is closable by a removable cover 28.

The stormwater treatment system 10 includes at least one conduit 30 communicating the first and second chambers 18, 20. Stormwater treatment media 32 is preferably positioned within the conduit 30. The stormwater treatment media 32 advantageously defines a pair of substantially helical flow paths 35, best shown in FIG. 5, for stormwater that passes through the conduit 30 from the first chamber 18 to the second chamber 20. Stormwater treatment media 32 also preferably has a substantially helical shape, as may be seen in FIG. 5. In the preferred embodiment, stormwater treatment media 32 is shaped as a double helix.

In the preferred embodiment, stormwater treatment system 10 further includes a second conduit 34, which also communicates the first and second chambers 18, 20 and has stormwater treatment media 32 positioned therein.

Each of the first and second conduits 30, 34 preferably has a strainer and diffuser assembly 36 mounted adjacent to an inlet opening 31 of the respective conduit 30, 34. Each of the conduits 30, 34 further include a second, outlet opening 33 which is in communication with the second, effluent chamber 20.

Figure 8:
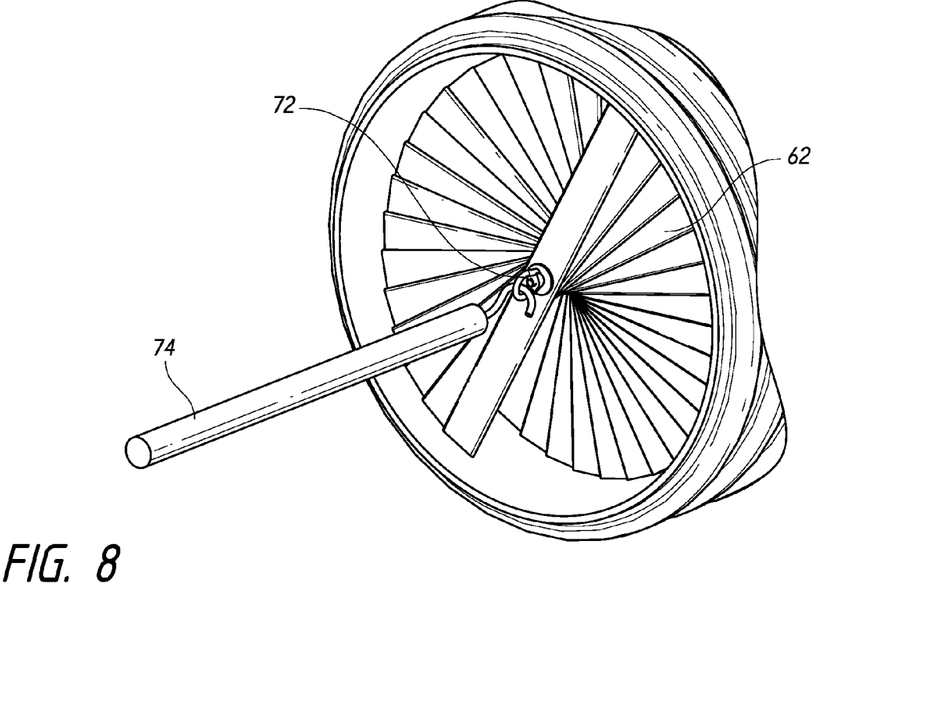
FIG. 8 is a diagrammatical depiction of a method of deploying and maintaining a stormwater treatment system of the type that is shown in FIG. 1.

The inner wall of the stormwater treatment system 10 may be provided with a pair of anchors 38 for releasably holding a deployment and recovery tool 74, which will be discussed in greater detail below in conjunction with FIG. 8.

The stormwater treatment system 10 further includes an inlet 40 for admitting stormwater into the first, influent chamber 18 and an outlet 42 for permitting treated stormwater to exit the second, effluent chamber 20. The first chamber 18 is partially defined by a wall 44 that is part of the base portion 12 and includes an upper edge 45. The space that is defined between the upper edge 45 of the wall 44 and the underside of the top slab 16 forms an emergency bypass or overflow path that permits untreated stormwater to pass from the first chamber 18 to the second chamber 20 without entering either of the conduits 30, 34.

The base portion 12 further includes first and second saddle portions 46, 48, which support the first and second conduits 30, 34. In the preferred embodiment, the first and second conduits 30, 34 are both positioned so that they are substantially horizontal, with their inlets 31 being at substantially the same elevation as their outlets 33.

Figure 4:
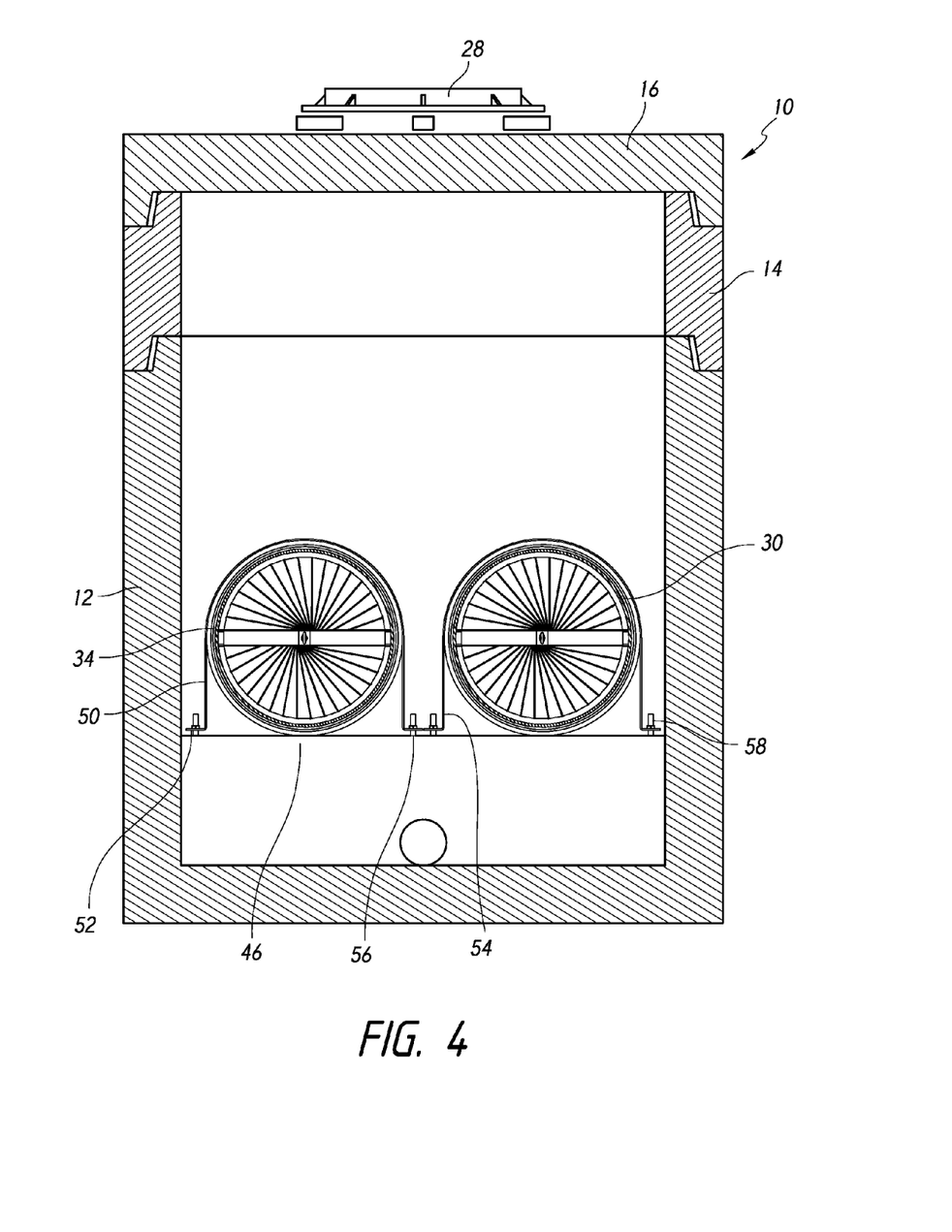
FIG. 4 is a cross-sectional view taken along lines 4-4 in FIG. 2.

As FIG. 4 shows, brackets 50, 54 are preferably used to secure the conduits 30, 34 and position relative to the saddle portions 46, 48, with connectors 52, 56, 58 being used to secure the brackets 50, 54 to the respective saddle portion 46, 48.

Figure 5:
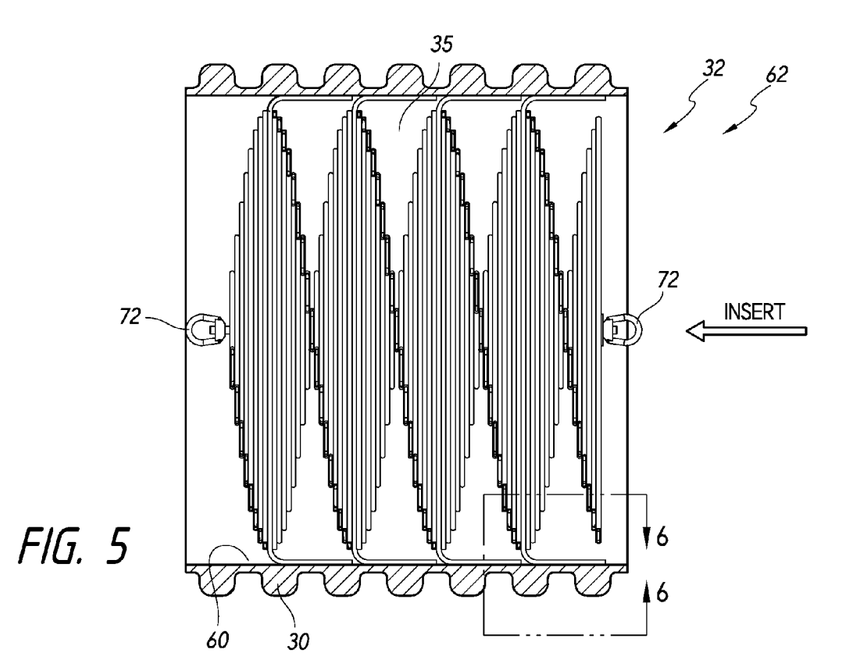
FIG. 5 is a longitudinal cross-sectional view depicting a component of the system that is shown in FIG. 1.
Figure 11:
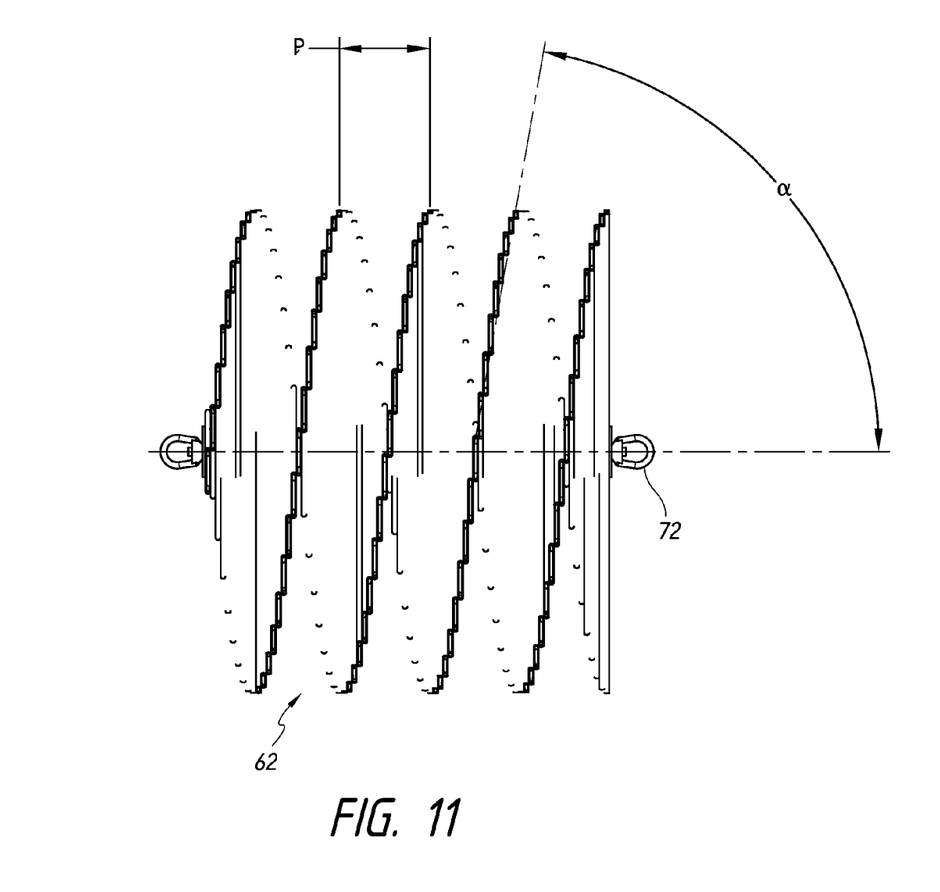
FIG. 11 is a diagrammatical depiction of one portion of the stormwater treatment system that is shown in FIG. 1.

As FIG. 5 shows, each of the conduits 30, 34 preferably has a substantially smooth inner surface 60. The stormwater treatment media that is positioned in either of the conduits 30, 34 is preferably embodied as a plurality of filter segments 62, each of which has a substantially helical shape having a pitch defined by an angle a, which is shown in FIG. 11. Preferably, the angle $\alpha$ is substantially within a range of about 65 degrees to about 87 degrees, more preferably substantially within a range of about 70 degrees to about 85 degrees and most preferably substantially within a range of about 75 degrees to about 82 degrees.

Filter segments 62 also have a pitch P, shown in FIG. 11, that is preferably substantially within a range of about 2 inches to about 10 inches, more preferably substantially within a range of about 3 inches to about 9 inches and most preferably substantially within a range of about 4 inches to about 8 inches.

According to one advantageous aspect of the invention, the treatment performance of the stormwater treatment media 32 may be preset or adjusted by setting or varying the pitch of the individual filter segments 32. By increasing the pitch, a greater flowrate becomes possible, but with less effective filtration. By decreasing the pitch, the design flow rate becomes less but the filtration is more effective.

Preferably, each of the individual filter segments 32 is sized so that it may be inserted and withdrawn through the access opening 22. Each of the filter segments 32 is preferably constructed so as to be slidable along the substantially smooth inner surface 60 of the respective conduit 30, 34 when it is being inserted and removed from the conduit 30, 34, and further is constructed to flexibly engage the inner surface 60 and seal against the inner surface 60 so as to define a constrained helical flow path 35. The filter segments 32 are preferably deployed within the respective conduits 30, 34 in situ, in a manner that will be described in greater detail below.

Figure 9:
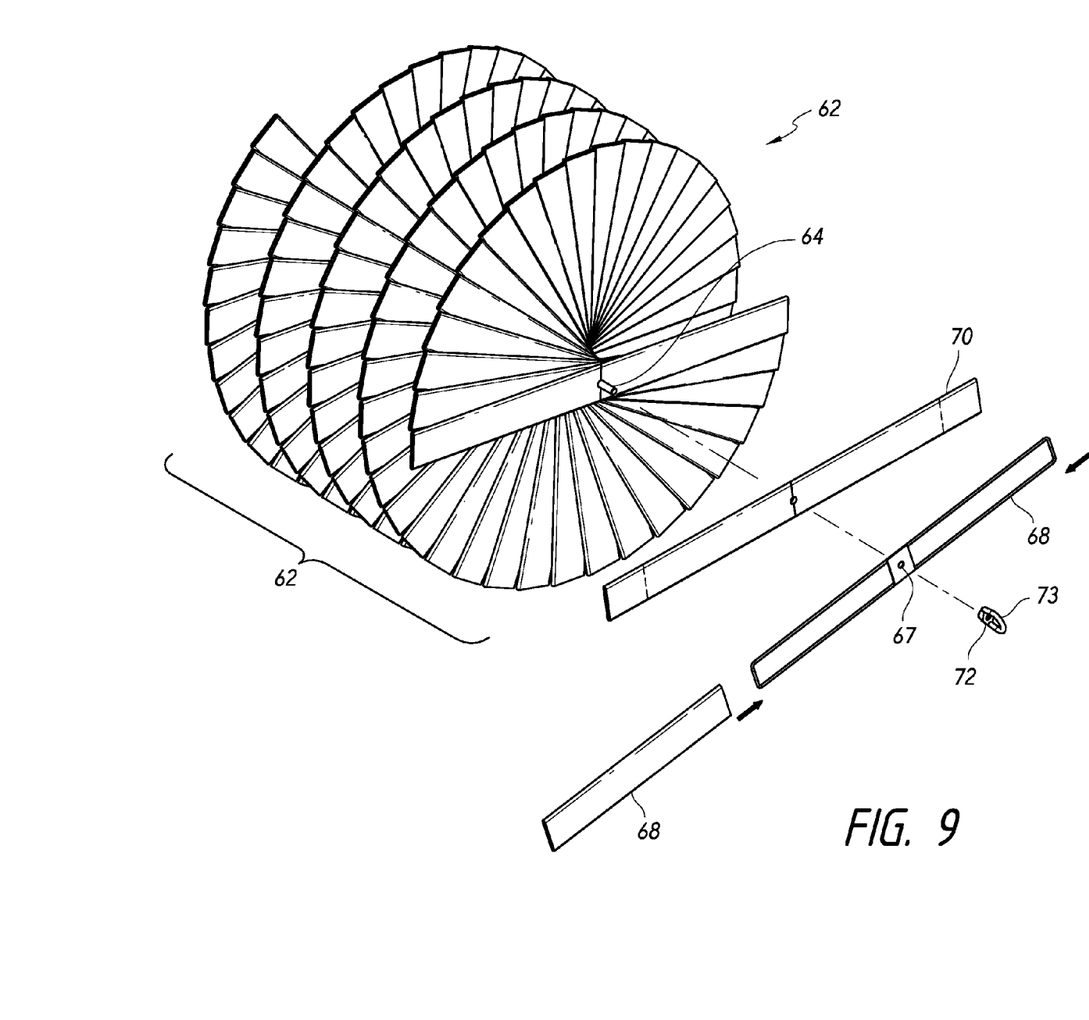
FIG. 9 is an assembly drawing depicting a filter segment that is used in the system that is shown in FIG. 1.

Referring to FIG. 9, which is an assembly view of a filter segment 62 that is constructed according to a preferred embodiment of the invention, the filter segment 62 includes a longitudinally extending threaded rod 64, which is used to connect a plurality of helical elements 70. Each of the helical elements 70 includes a flexible wire frame 66 having a hole 67 for receiving the threaded rod 64. A media sleeve 68 is fitted over each end of the flexible wire frame 66. In the preferred embodiment, the media sleeve 68 is fabricated from filtration media, such as a foam material or a fabric material. Depending on the target pollutant, Open Cell Foam (Bacteria, Nutrients, Heavy Metals) or Hydrophobic Fabric (Hydrocarbons) may be used.

The filter segment 62 accordingly defines a double helix having two separate helical flow paths 35. Stormwater can move from one end of one of the flow path 35 to a second, opposite end, or it can penetrate the media sleeve 68 and enter into the second flow path 35, thereby being filtered.

All filters tend to blind over time. In most filter systems, this results in the front filters blinding first, preventing water from reaching the subsequent filters. However, the helical filter system described herein is unique in that has the front portion of the helix begins to blind due to pollutants, the water will naturally climb through the helical filter path 35 is necessary, thereby contacting fresh media as needed. Over the life of the filter, this results in an evenly spent filter. In other words, efficient use of the filtration media is optimized.

Figure 6:
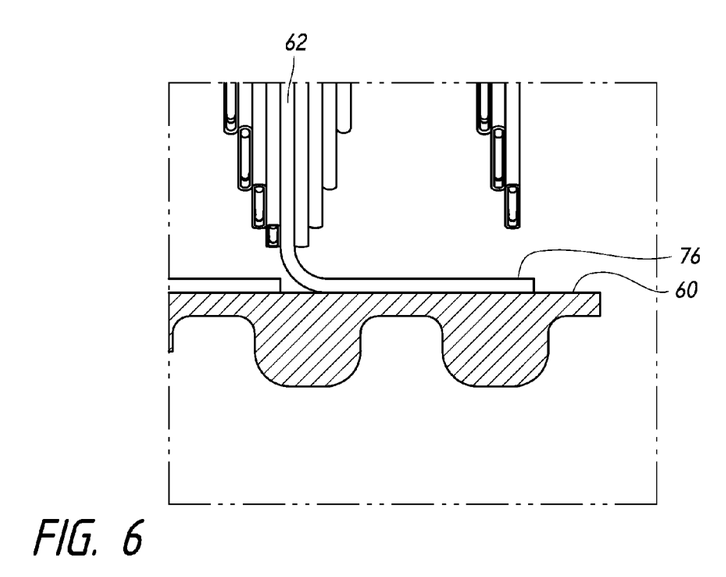
FIG. 6 is an enlarged view of a portion of FIG. 5.
Figure 7:
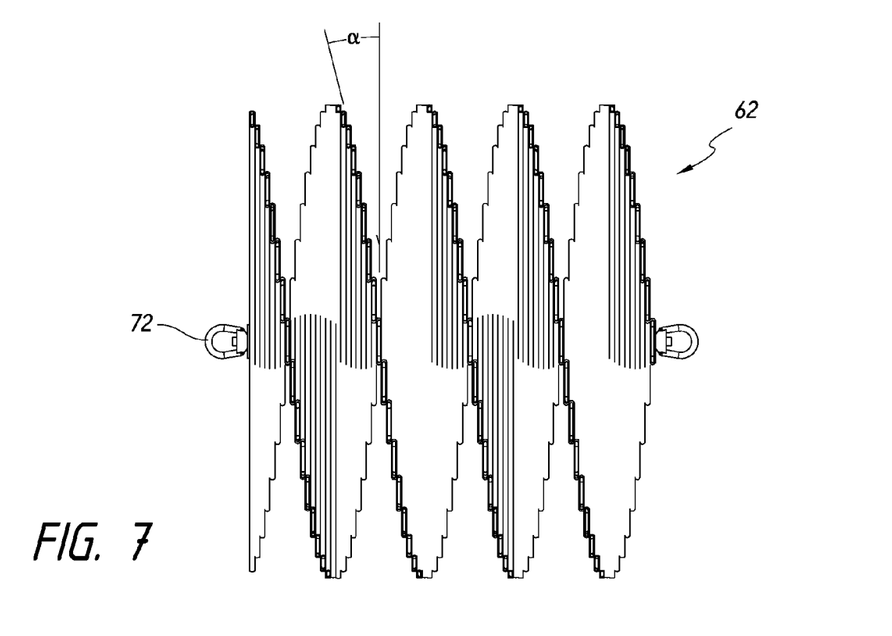
FIG. 7 is a side elevational view of a component of the system that is shown FIG. 1.

As FIG. 6 shows, at least one of the media sleeves 68 is preferably long enough so as to bend against the smooth inner surface 60 of the conduit 30, 34 and form a seal with respect to the surface 60.

A connector 72 having an eye hook 73 is threaded over each end of the threaded rod 64 for holding the assembly together. As FIG. 8 illustrates, the eye hook 73 may be engaged by the end of the tool 74 in order to insert or remove the filter segments 62 from the inside of the respective conduit 30, 34.

The stormwater treatment system 10 benefits from regular maintenance intervals to remain effective as a stormwater filter. Maintenance requirements and frequency are dependent on the pollutant load characteristics of the site of deployment. The influent and effluent chambers 18, 20 should be cleaned of any collected oil, trash, debris and sediment that may inhibit filter performance. Inspection personnel may access the interior of the system 10 through the access openings 22, 26 in order to periodically inspect the condition of the system 10, including the stormwater treatment media 32.

If replacement of the helical filter segments 62 is determined to be necessary, the access covers 24, 28 will be removed, permitting venting of the interior chamber of the system 10. The interior of the chambers 18, 20 may be cleaned with the use of an external vacuum device, such as a vacuum truck.

Removal of the helical filter segments 62 is preferably performed from the first, influent chamber 18. A ladder is used to enter the influent chamber 18, and the diffuser assembly 36 is removed from each of the conduits 30, 34. Each diffuser assembly 36 is preferably attached to the housing by means of releasable fasteners such as wing nuts. A pair of pliers may be required to loosen the wing nuts.

With the diffuser assembly 36 removed, the helical filter segments 62 are exposed and can be pulled directly out of the respective conduit 30, 34. In the preferred embodiment, each conduit 30, 34 will include five separate helical filter segments 62. The individual helical filter segments 62 are preferably not directly connected to each other. The tool 74 is preferably used to engage the eye hooks 73 of the respective filter segments 62 in order to remove the helical filter segment 62 from the respective conduit 30, 34. In the event that one of the helical filter segments 62 cannot be removed manually using the tool 74, one or more of the anchors 38 may be used in conjunction with a mechanical force amplifying device such as a ratchet pulling device or crank puller.

The filter segments 62 are preferably removed one at a time and located under the access opening 22, where they may be lifted out of the system 10 through the access opening 22. A mechanical lifting device may be used in order to lift the filter segments 62 out of the system 10. Advantageously, the eye hook 73 is constructed so as to be able to bear the full weight of a saturated filter segment 62.

After the filter segments 62 have been removed, the interior of the respective conduit 30, 34 is inspected for damage. Any sediment and debris is removed prior to inserting new filter segments 62.

Figure 10:
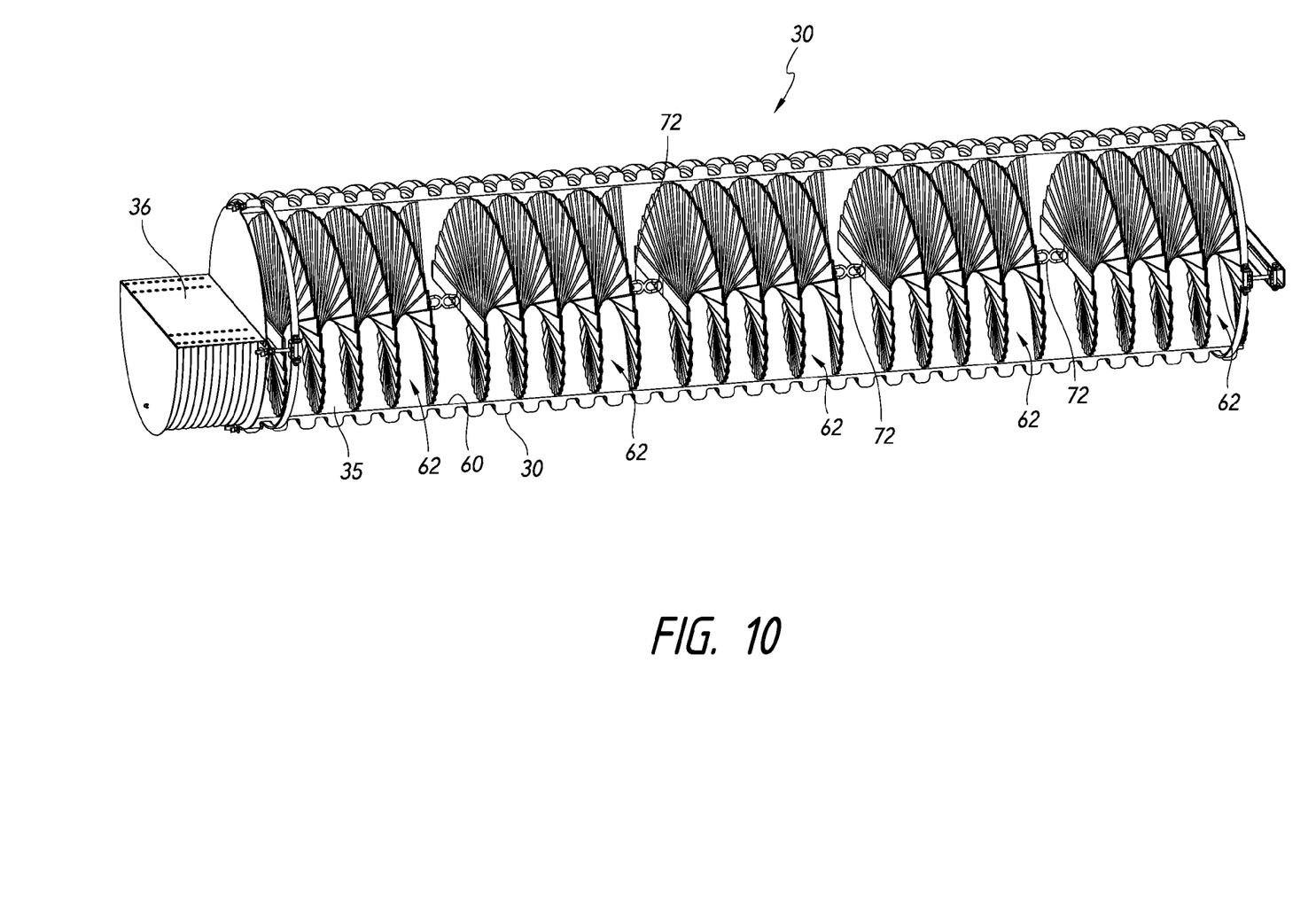
FIG. 10 is a fragmentary cross-sectional view depicting one portion of the stormwater treatment system that is shown in FIG. 1.

The new filter segments 62 are preferably lowered through the access opening 22 with the aid of a mechanical lifting device, with the full weight of the filter segments 62 being borne by the eye hook 73. Each of the filter segments 62 is carefully pushed into the respective conduit 30, 34. Each of the filter segments 62 is preferably assembled (stacking the wire frames) in a counter-clockwise direction. This allows the filter segment 62 to be installed in the conduit 30, 34 in either direction and insures that the helical paths 35 through the conduit 30, 34 are in a continuous direction. Once the filter segments 62 are properly positioned within the respective conduit 30, 34, as is shown in FIG. 10, the diffuser assembly 26 is replaced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A stormwater treatment system, comprising:
   structure defining a first chamber for receiving stormwater;
   structure defining a second chamber;
   a conduit communicating the first and second chambers; and
   stormwater treatment media positioned within the conduit, the stormwater treatment media defining a substantially helical flow path for stormwater that passes through the conduit from the first chamber to the second chamber.

2. A stormwater treatment system according to claim 1, wherein the conduit has a substantially smooth inner surface, and wherein the stormwater treatment media bears against the inner surface.

3. A stormwater treatment system according to claim 1, wherein the stormwater treatment media has a substantially helical shape.

4. A stormwater treatment system according to claim 1, wherein the stormwater treatment media has a flexible frame, and wherein the stormwater treatment media is mounted to the flexible frame.

5. A stormwater treatment system according to claim 4, wherein the flexible frame comprises a wire material.

6. A stormwater treatment system according to claim 1, further comprising strainer means positioned adjacent to an inlet opening of the conduit for preventing large debris from entering the conduit.

7. A stormwater treatment system according to claim 1, wherein the stormwater treatment media comprises filtration media.

8. A stormwater treatment system according to claim 7, wherein the filtration media comprises a material selected from a group consisting of foam material and fabric material.

9. A stormwater treatment system according to claim 1, further comprising an upper wall having at least one access opening defined therein, and wherein the access opening has a minimum diameter that is greater than a maximum diameter of the conduit.

10. A stormwater treatment system according to claim 1, wherein the conduit has an inlet opening and an outlet opening, and wherein the inlet opening is at substantially the same elevation as the outlet opening.

11. A stormwater treatment system according to claim 1, wherein the substantially helical flow path extends continuously from a first end of the stormwater treatment media to a second, opposite end of the stormwater treatment media.

* * * * *